(12) United States Patent
Fondeur

(10) Patent No.: US 7,515,791 B2
(45) Date of Patent: Apr. 7, 2009

(54) PHASE MATCHED OPTICAL GRATING

(75) Inventor: Barthelemy Fondeur, San Jose, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 0 days.

(21) Appl. No.: 11/423,608

(22) Filed: Jun. 12, 2006

(65) Prior Publication Data
US 2006/0285795 A1 Dec. 21, 2006

Related U.S. Application Data

(60) Provisional application No. 60/691,489, filed on Jun. 17, 2005.

(51) Int. Cl.
*G02B 6/34* (2006.01)
*G02F 1/01* (2006.01)
(52) U.S. Cl. .............................. 385/37; 385/1; 385/15; 385/31; 385/32; 385/39; 385/46; 385/50
(58) Field of Classification Search ............... 385/37
See application file for complete search history.

(56) References Cited

U.S. PATENT DOCUMENTS

| | | | |
|---|---|---|---|
| 6,339,664 B1 | 1/2002 | Farjady et al. ............... 385/37 |
| 6,526,202 B1 * | 2/2003 | Fondeur ....................... 385/37 |
| 6,665,466 B2 | 12/2003 | Katayama .................... 385/24 |
| 6,768,842 B2 | 7/2004 | Bulthius et al. .............. 385/37 |
| 2004/0047561 A1 * | 3/2004 | Tuda ............................. 385/39 |
| 2004/0151432 A1 | 8/2004 | Tabuchi et al. ............... 385/37 |

* cited by examiner

*Primary Examiner*—Frank G Font
*Assistant Examiner*—Ryan Lepisto
(74) *Attorney, Agent, or Firm*—Allen, Dyer, Doppelt, Milbrath & Gilchrist, P.A.

(57) ABSTRACT

The invention relates to phase matched optical gratings for performing signal multiplexing and demultiplexing in optical communications networks. In prior art gratings there is a phase linearity error between the grating line and the outputs on the focal line, comparing the center output to the surrounding outputs. This corresponds to a relative phase difference between each output which limits the passband. In the case of the AWG this degradation comes primarily from field aberrations in the output star coupler. The present invention has found that if the grating line of the optical grating is disposed on a ellipse instead of a circular arc, while the focal line of outputs defines a substantially circular arc, an optimum can be found where the phase linearity error is substantially eliminated, and all outputs have substantially the same phase. As a result, this creates substantially uniform passbands across the WDM spectrum.

16 Claims, 13 Drawing Sheets

PHASE MATCHED OPTICAL GRATING

CROSS-REFERENCE TO RELATED APPLICATIONS

The present invention claims priority from Provisional Patent Application No. 60/691,489 filed Jun. 17, 2005 which is incorporated herein by reference.

TECHNICAL FIELD

The present invention relates to phase matched optical gratings for performing signal multiplexing and demultiplexing in optical communications networks transmitting wavelength division multiplexed WDM signals. Phase matched optical gratings provide equal phase output channels across the transmission spectrum.

BACKGROUND OF THE INVENTION

Increasing the transmission capacity in optical networks requires demultiplexers, such as free space bulk gratings or integrated optics such as arrayed waveguide gratings (AWG) and echelle gratings, which can provide wider passband and lower ripple within the passband. This is particularly true for network systems transmitting higher bit rates which have wider spectra. Moreover, optical networks using reconfigurable optical add-drop modules (ROADM) have optical signals passing through cascades of demultiplexers and multiplexers, making accumulated losses more critical.

It is desirable that the passband of all the output channels is constant in a device, preferably having a same width and flat top profile. Numerous examples exist in the prior art of designs to increase the passband width, provide a flat top profile and to reduce ripple. However, it has been observed that the passband shape varies across the outputs in a standard AWG. The passband of the center output has the highest amplitude and frequency width which becomes lower and narrower for the outputs progressively further from the center. The passband variability leads to a deformation of the filter function from output to output reducing the flatness as well as increasing the ripple. This limits the performance of the AWG as it reduces the quality of the outer channels.

U.S. Pat. No. 6,768,842 issued to Alcatel Optonics UK Limited, Jul. 27, 2004 discloses an AWG in which the angle of the array waveguides at the star coupler waveguides is chirped to remove third-order aberration (COMA) which would otherwise cause asymmetry in the AWG output channel signals, especially where the AWG has a flattened passband. The shape of the star coupler is not changed.

It has been determined in accordance with the present invention that there is a phase linearity error between the grating line and the outputs on the focal line, comparing the center output to the surrounding outputs, when a confocal or Rowland configuration is used. This corresponds to a relative phase difference between each output which limits the passband. In the case of the AWG this degradation comes primarily from field aberrations in the output star coupler, whether confocal or Rowland. The same degradation happens also for the input star coupler if input waveguides are used away from the center.

U.S. Pat. No. 6,339,664 issued to British Technology Group, Jan. 15, 2002, discloses an AWG for which a non-linear Δl increment is designed to broaden the 3 dB passband. This is done by incorporating a non-linear, parabolic function in the path length increment of the waveguide array. It can be realized as a change in the grating line, or by altering the waveguides without changing the circular grating line. Either method changes the average phase. However, this patent does not recognize the phase error caused by the star coupler geometry. As a result no correction to individual output phase is made and the passband uniformity is not improved across the wavelength spectrum, even while the passband is broadened.

This phase linearity error results from a geometric configuration common to many optical gratings. For instance, a concave bulk optical grating or an echelle grating also typically include an arcuate grating line opposite an arcuate focal line, leading to the same phase error, which is generally ignored. Changing the phase in the array arriving at the grating line only changes the average phase seen by the outputs. It is the grating line geometry which controls output to output variations.

An object of the present invention is to provide an optical grating for which all of the outputs are substantially equal in amplitude and width.

It is a further object of the present invention to provide an optical grating for which all of the outputs are substantially phase matched.

SUMMARY OF THE INVENTION

The present invention has found that if the grating line of the optical grating is disposed on a ellipse instead of a circular arc, while the focal line of outputs defines a circular arc, an optimum can be found where the phase linearity error is substantially eliminated, and all outputs have substantially the same phase. As a result, this creates substantially uniform passbands across the WDM spectrum.

Accordingly, the present invention relates to optical grating for separating input light of a plurality of wavelengths into a plurality of spatially separated wavelength channel bands comprising:

a grating having a concave grating line comprising a non-circular ellipse and having a focus f; a plurality of outputs disposed on a substantially circular arc through f having a radius substantially equal to a focal length of the ellipse;

such that light in each wavelength channel band received at the outputs has substantially the same phase.

An embodiment of the present invention comprises an optical grating comprising an integrated arrayed waveguide grating having:

at least one input waveguide optically coupled to a focal line of an input star coupler;

a grating comprised of a plurality of waveguide arms, the ends of the waveguide arms forming a grating line at each of the input star coupler and an output star coupler;

a plurality of output waveguides coupled to a focal line of the output star coupler, wherein the grating line of the output star coupler comprises the non-circular ellipse.

Another aspect of the present invention relates to an optical grating for separating input light of a plurality of wavelengths into a plurality of spatially separated wavelength channel bands comprising an arrayed waveguide grating having, in a demultiplexing direction:

a grating comprising a plurality of waveguide arms, each waveguide arm having an optical path length difference from any of the other waveguide arms;

an input star coupler optically coupled to the grating at an input grating line and optically coupled to at least one input waveguide at an input focal line;

an output star coupler optically coupled to the grating at an output grating line and optically coupled to a plurality of output waveguides at an output focal line, wherein the output grating line comprises a non-circular ellipse having a focal length, and the output focal line comprises a circular arc having a radius substantially equal to the focal length of the ellipse, and a centerpoint of the focal line disposed substantially a focal length of the ellipse from the grating line such that light in each channel band at the plurality of outputs has substantially a same phase.

BRIEF DESCRIPTION OF THE DRAWINGS

The invention will be described in greater detail with reference to the accompanying drawings which represent preferred embodiments thereof, wherein.

Of course it is well understood in the art that these devices, while described according to their demultiplexing functions work equally in reverse as multiplexers. Elements such as inputs and outputs are referred to consistently in the demultiplexing function for clarity and consistency, though of course for multiplexing, their functions are reversed.

DETAILED DESCRIPTION

Figure 1:
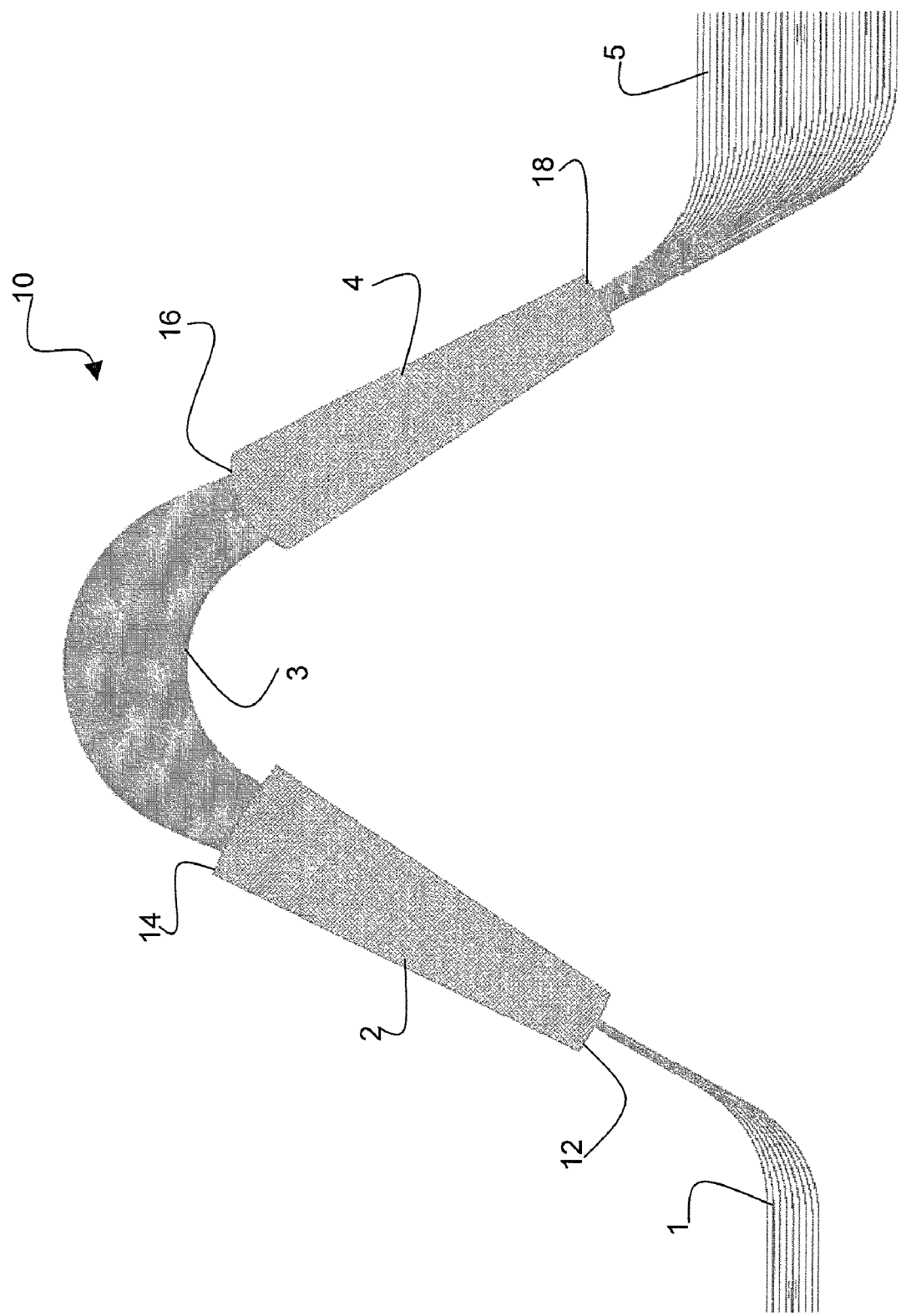
FIG. 1 is an illustration of an arrayed waveguide grating (AWG) in accordance with the present invention.

With reference to FIG. 1, an arrayed waveguide grating AWG is shown generally at 10, in accordance with the present invention, consisting of an input waveguide 1 optically coupled to an input star coupler 2 at an input focal line 12. The input star coupler 2 is optically coupled to an array of waveguide arms 3 at an input grating line 14. The array of waveguide arms 3 is optically coupled to an output star coupler 4 at an elliptical output grating line 16. Light from the array of waveguide arms 3 is transmitted across the output star coupler 4 to a plurality of output waveguides 5 arranged on an output focal line 18.

Figure 2:
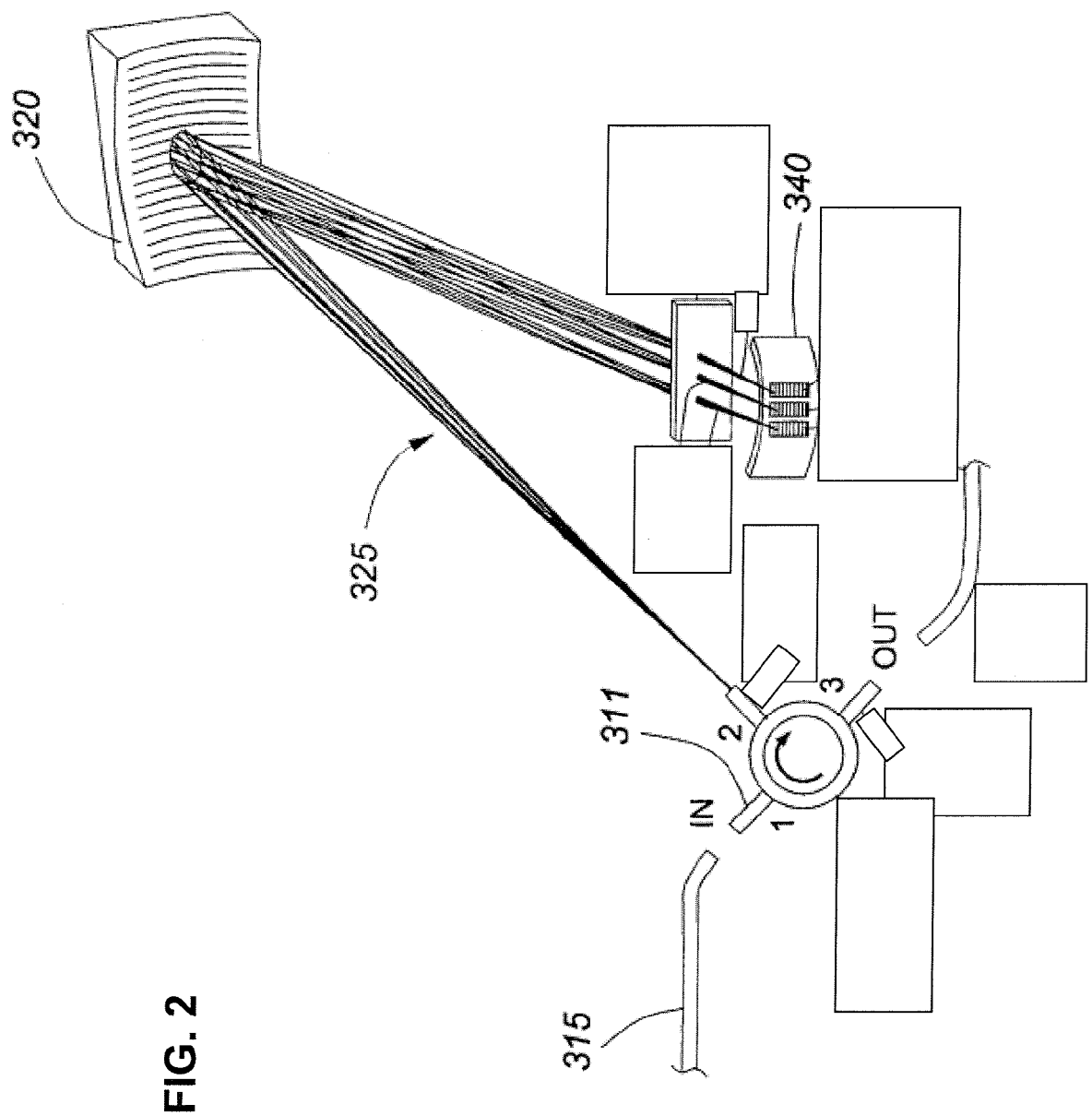
FIG. 2 is a concave diffraction grating demultiplexer in accordance with the present invention.

FIG. 2 illustrates a diffraction grating multiplexer shown generally at 325. A WDM signal comprising light having a plurality of wavelengths is coupled from waveguide 315 into a circulator 311 at port 1 and directed from output port 2 toward the concave diffraction grating 320. Grating 320 has an ellipsoid profile to modify the phase of the dispersed output channels in accordance with the present invention. Dispersed wavelength channels are focused on an arcuate output coupler 340, in this case a reflective wavelength equalizer.

Figure 3:
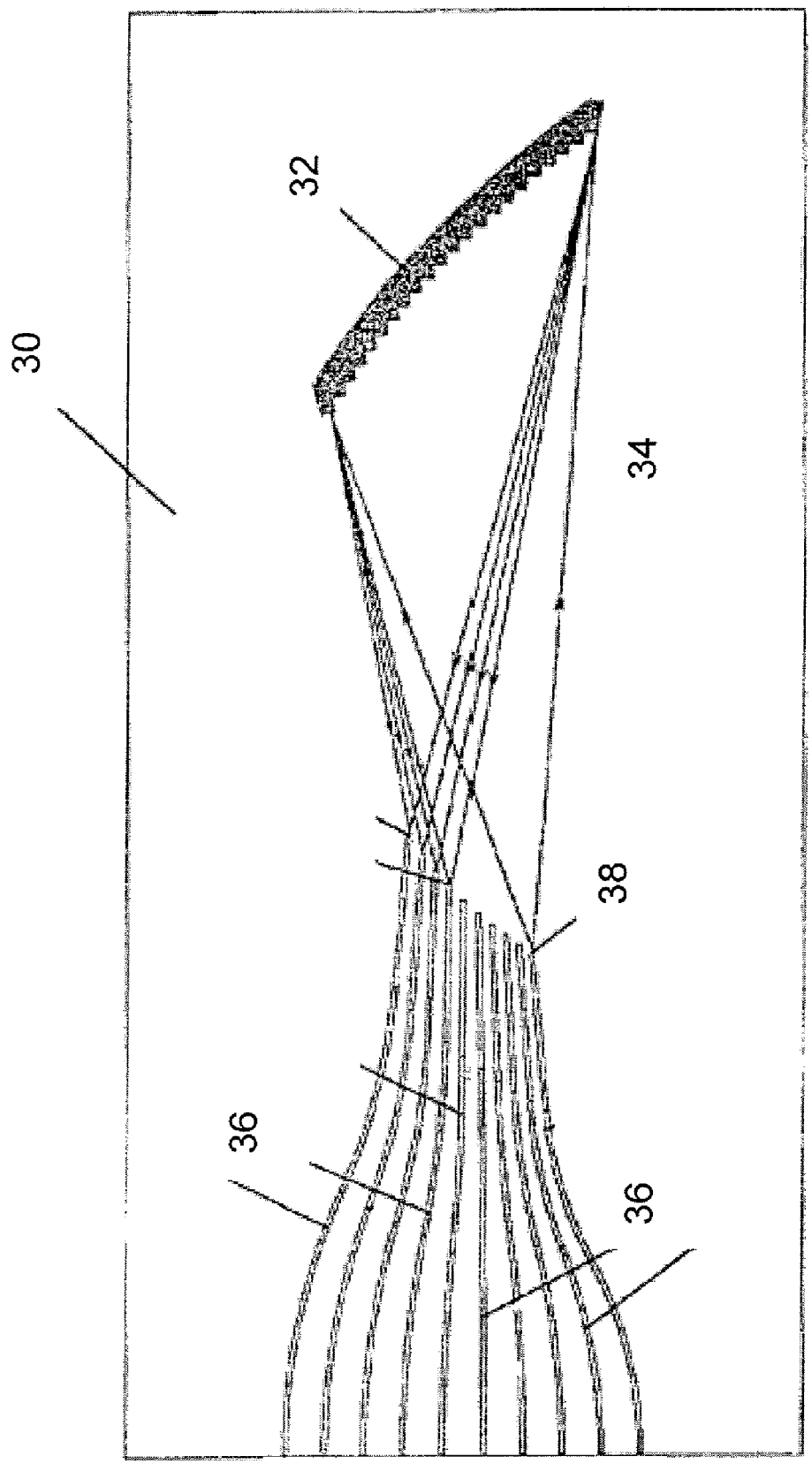
FIG. 3 is an echelle grating in accordance with the present invention.

FIG. 3 illustrates an echelle grating 30 having an arcuate grating element 32 formed in an integrated device opposite a free space region 34 from a plurality of input and output waveguides 36. The waveguides 36 are optically coupled to the free space region 34 along an arcuate focal line 38. Grating 32 defines an elliptical curve.

Figure 4:
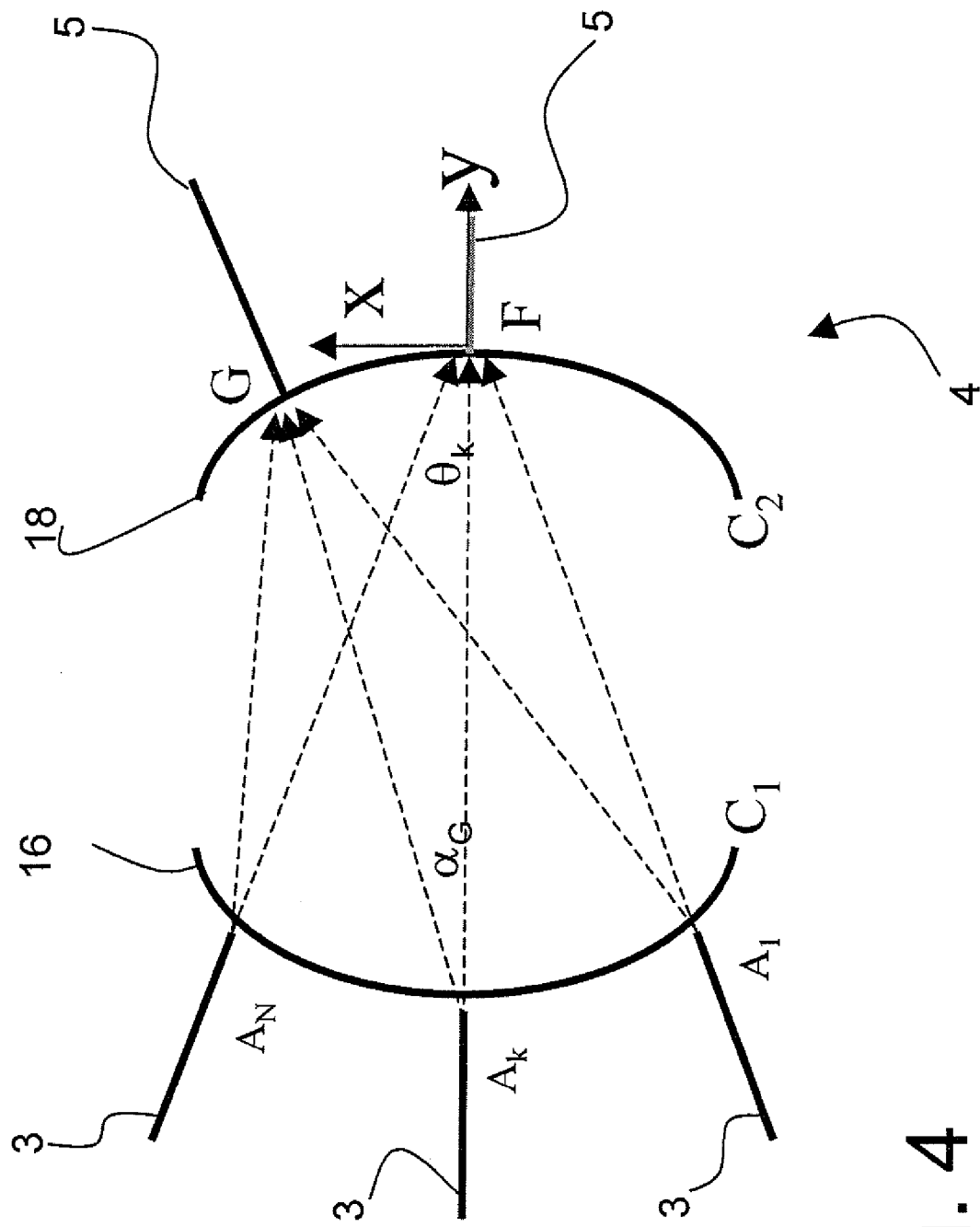
FIG. 4 is a schematic illustration of a prior art confocal star coupler.

Turning to FIG. 4, specifically focusing on the output star coupler 4, in a standard geometry the array of waveguide arms 3 enters the output star coupler 4 at a circular curve $C_1$ of radius R. The output waveguides 5 are disposed at a distance R from the array of waveguide arms 3, also disposed on a circular arc $C_2$, which is usually of the same radius R (confocal configuration) or R/2 (Rowland circle configuration). FIG. 4 illustrates the confocal configuration, where $A_k$ is located on a circular arc $C_1$ at $$\begin{pmatrix} R\sin\theta_k \\ -R\cos\theta_k \end{pmatrix}$$

and G on a circular arc $C_2$ at $$\begin{pmatrix} R\sin\alpha_G \\ R(\cos\alpha_G - 1) \end{pmatrix}$$

in the reference system centered on F.

Light received by an output G can be calculated by the complex sum of the contributions from each of the array waveguide $A_1$ to $A_N$ weighted by their phase from the propagation through the star coupler.

$$T_G(\lambda) = \left| \sum_{k=1}^{N} a_k(\lambda) e^{\frac{2i\pi \cdot k \cdot m\lambda_c}{\lambda}} e^{\frac{2i\pi n_s GA_k}{\lambda}} \right|^2 \quad \text{(Eq. 1)}$$

Where $\lambda$ is the wavelength, m is the order of the AWG, $\lambda_c$ is the center wavelength, $a_k$ is the complex amplitude of the light in $A_k$, and $n_s$ is the effective index in the slab.

If an output is placed at the exact center F of the arc $C_1$, the paths $FA_1$ to $FA_N$ are equal and will not affect the transmission. (Eq. 1) becomes $$T_F(\lambda) \left| \sum_{k=1}^{N} a_k(\lambda) e^{\frac{2i\pi \cdot k \cdot m\lambda_c}{\lambda}} \right|^2 \quad \text{(Eq. 2)}$$

For an off-center output at G, the paths $GA_1$ to $GA_N$ will be approximately linear with respect to k, as seen in Eq.3.

$$GA_k = R\sqrt{(\cos\alpha_G - 1 + \cos\theta_k)^2 + (\sin\alpha_G - \sin\theta_k)^2} \quad \text{(Eq. 3)}$$

$$= R\sqrt{1 - 2\sin\theta_k\left(\sin\alpha_G - 4\left(\sin\frac{\alpha_G}{2}\right)^2\right)}$$

$$= R(1 - k\delta\theta\sin\alpha_G) + \text{error}(\alpha_G, k)$$

Eq. 1 becomes $$T_G(\lambda) = \left| \sum_{k=1}^{N} a_k(\lambda) e^{\frac{2i\pi \cdot k \cdot m\lambda_c}{\lambda}} e^{\frac{2i\pi n_s R(1-k\cdot\delta\theta\sin\alpha_G)}{\lambda}} e^{\frac{2i\pi n_s \text{error}(\alpha_G,k)}{\lambda}} \right|^2 \quad \text{(Eq. 4)}$$

$$T_G(\lambda) = \left| \sum_{k=1}^{N} a_k(\lambda) e^{\frac{2i\pi k \cdot m\left(\lambda_c - \frac{n_s R\delta\theta\sin\alpha_G}{m}\right)}{\lambda}} e^{\frac{2i\pi n_s \text{error}(\alpha_G,k)}{\lambda}} \right|^2 \quad \text{(Eq. 5)}$$

$$\approx T_F\left(\lambda - \frac{n_s R\delta\theta\sin\alpha_G}{m}\right)$$

This results in a spectrum similar to the one in F, but at a different wavelength, when the case the error from linearity is not taken into account as seen in the above equation.

Figure 5:
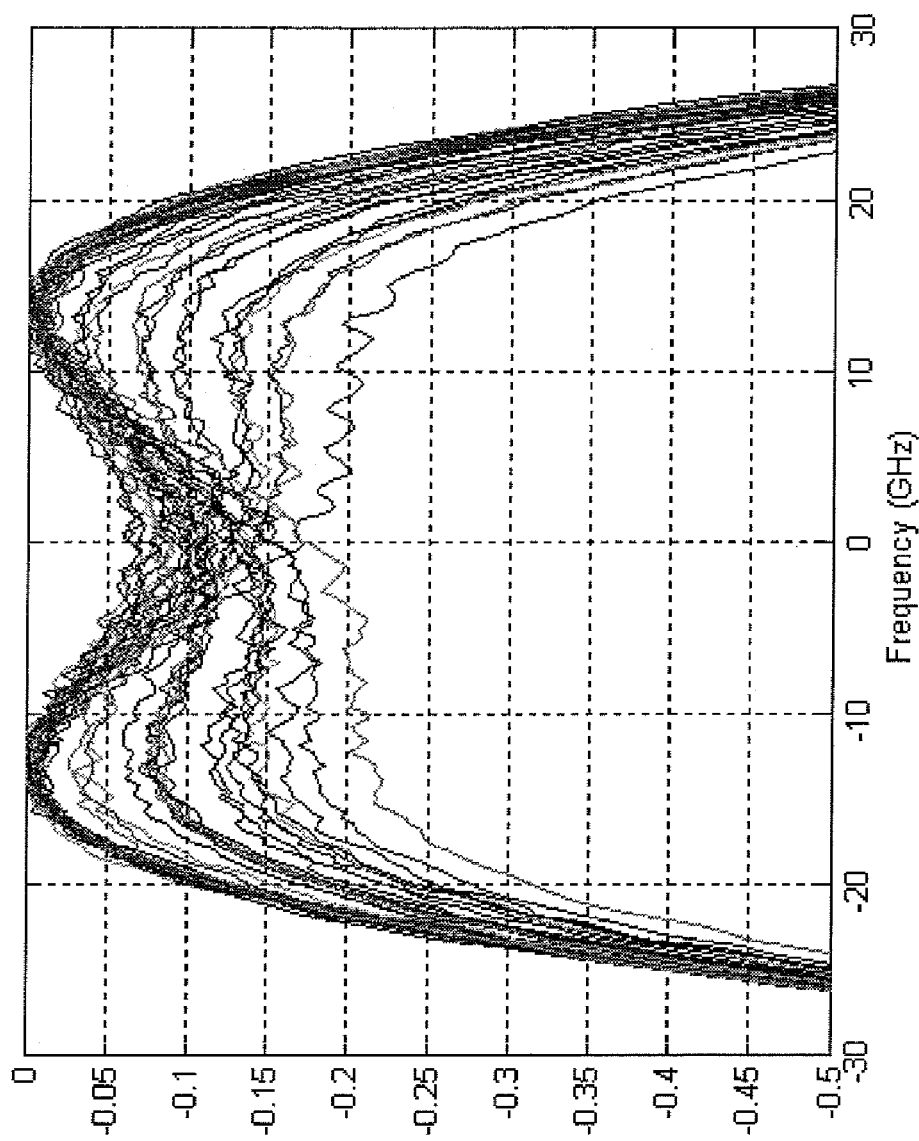
FIG. 5 is a graphic illustration of the passband of a prior art flat-top AWG with a confocal star coupler.

In prior art star coupler designs, such error was ignored (confocal or Rowland circle). However, especially for large number of outputs, the phase linearity error will produce a significant degradation of the transmission. FIG. 5 shows the transmission of the 40 outputs of a flat-top AWG using a conventional confocal design. As can be seen, the passband tilts from one side to the other side across the channel outputs.

Figures 6A, 6B:
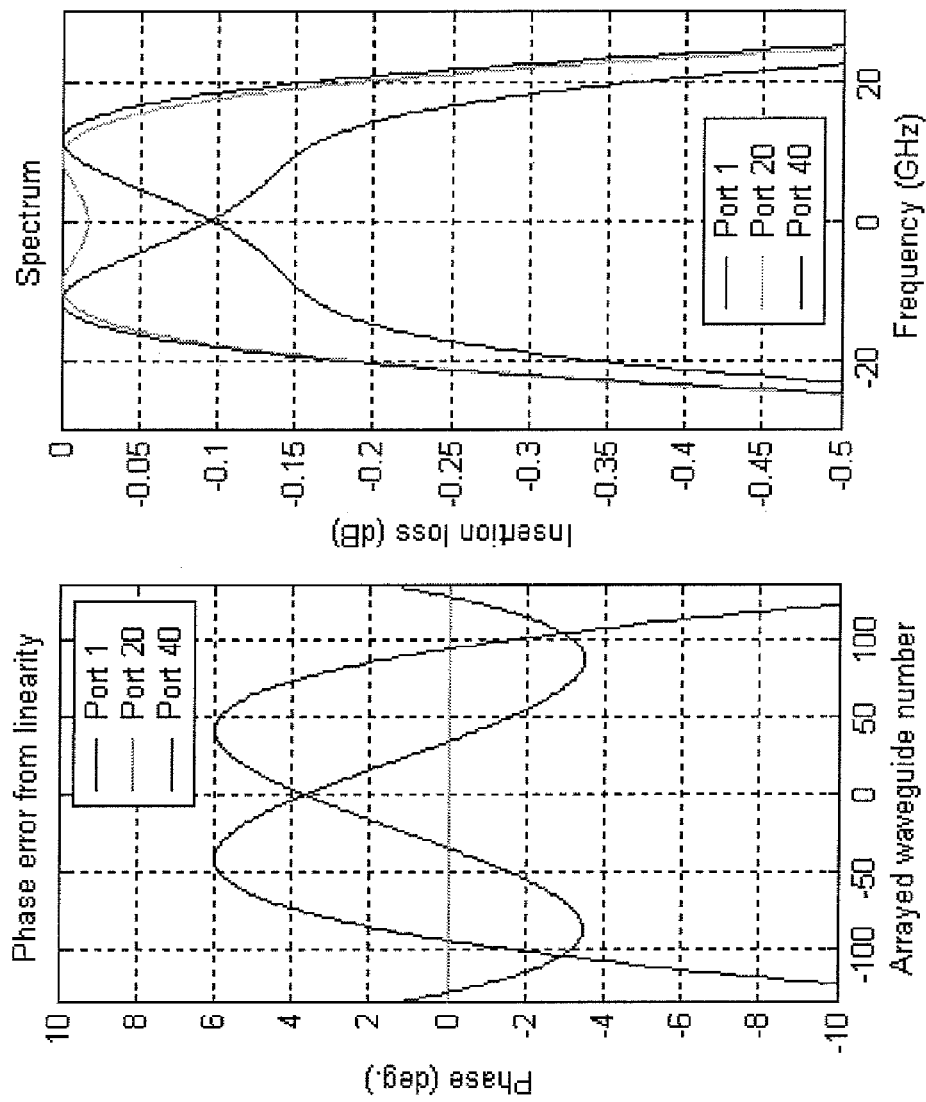
FIG. 6A is a graphic illustration of a simulation of the phase error from linearity calculated across three outputs of the AWG of FIG. 5.
FIG. 6B is a graphic illustration of a simulated passband spectrum of the three outputs represented in FIG. 6A.

To confirm that the model exposed above is valid to explain the non-uniformity of the passband across the ports, the phase error from linearity for the ports 1, 20 (center), and 40 of a flat-top AWG is calculated. FIG. 6A shows the phase linearity error calculated for the ports 1, 20, and 40. FIG. 6B shows the effect of the phase linearity error on the simulated spectrum of the AWG for the ports 1, 20, and 40. The good correlation between this simulation and the experimental results shown in FIG. 5 validates the model and confirms the origin of these passband variations in the standard star coupler design.

Figure 7:
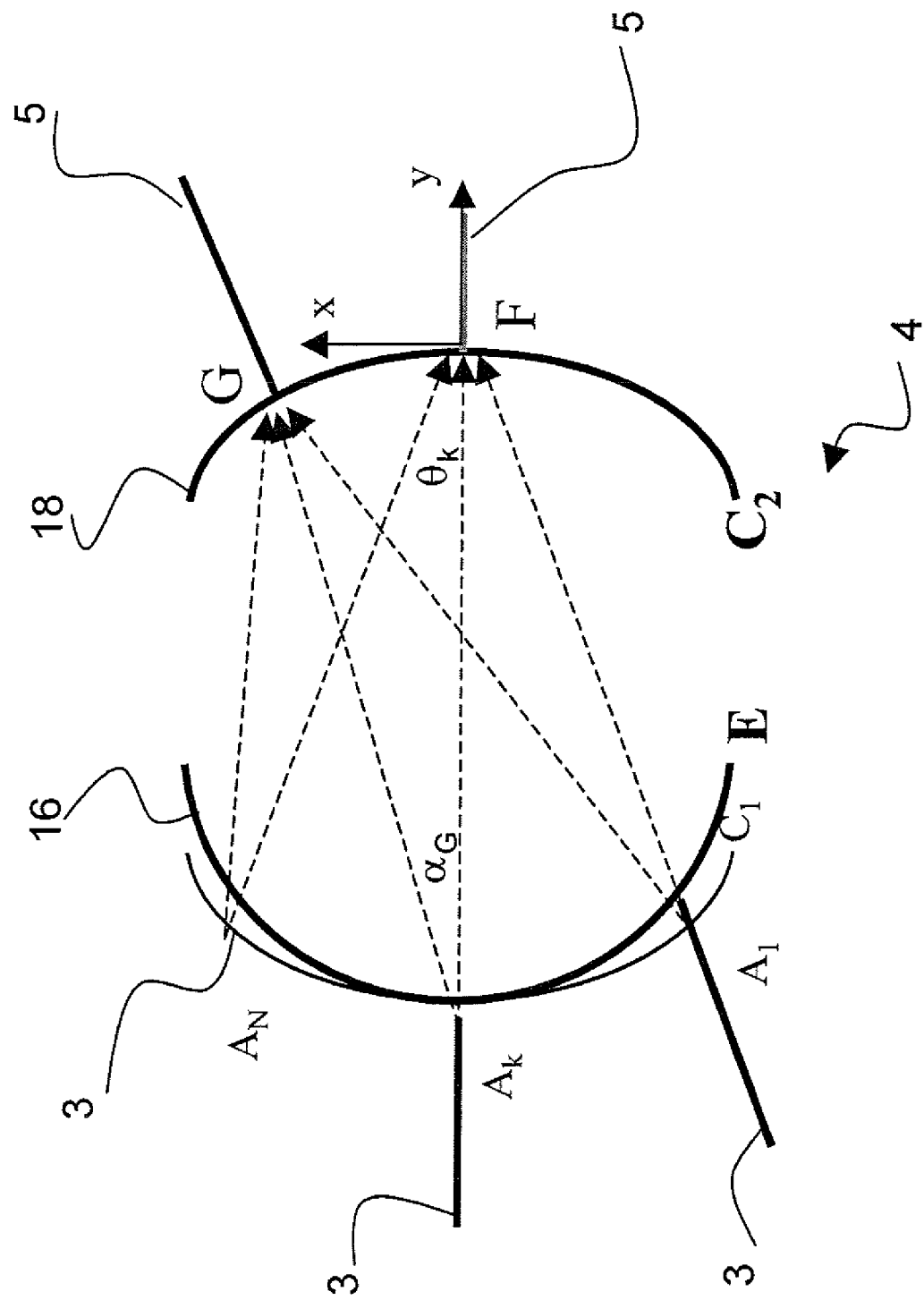
FIG. 7 is a schematic illustration of a star coupler in accordance with the present invention.
Figure 10A:
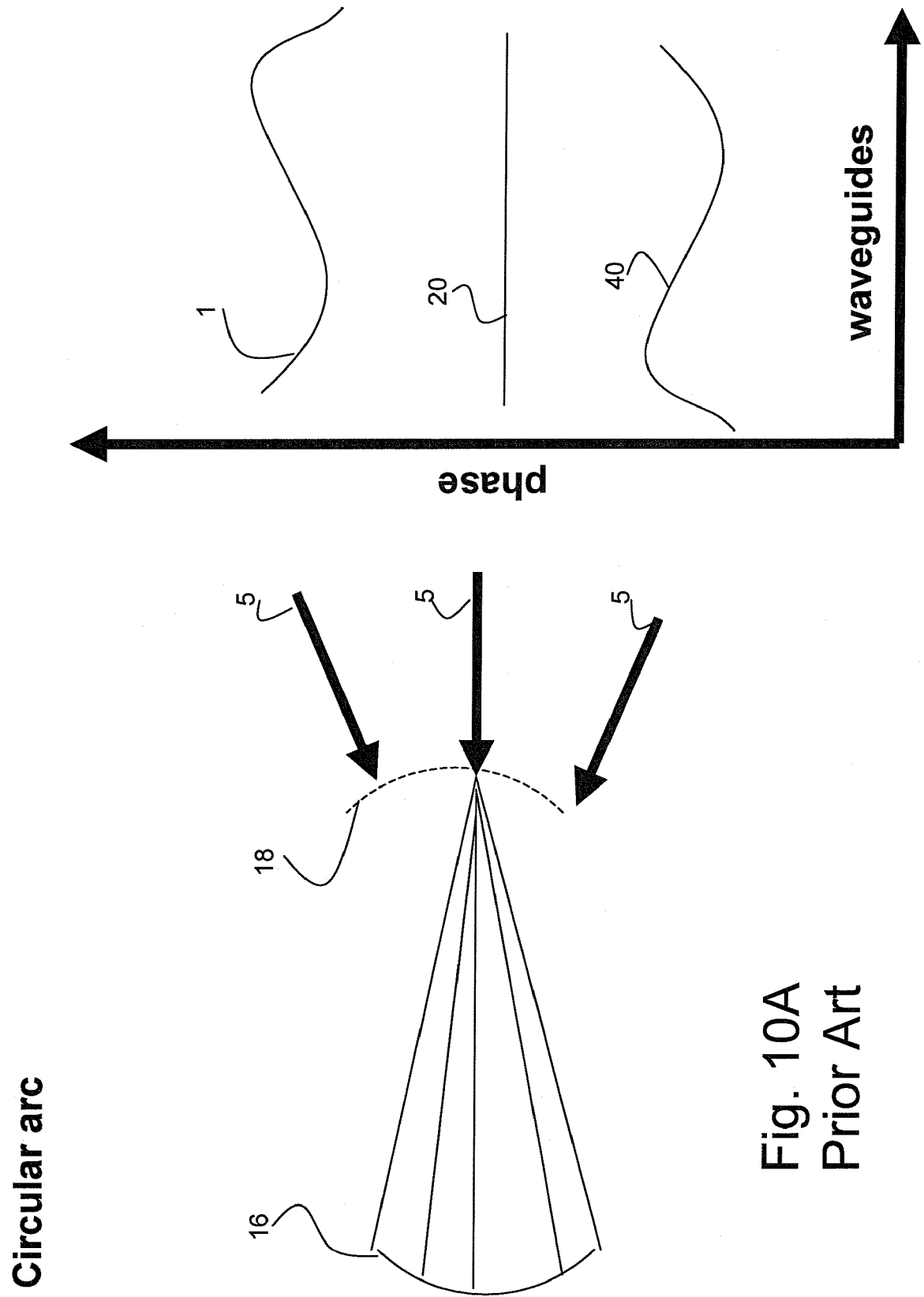
FIG. 10A is a schematic and a simulated graphic illustration of the phase of three outputs from a star coupler having a circular grating line, the center output is disposed at a center point of the grating line.
Figure 10B:
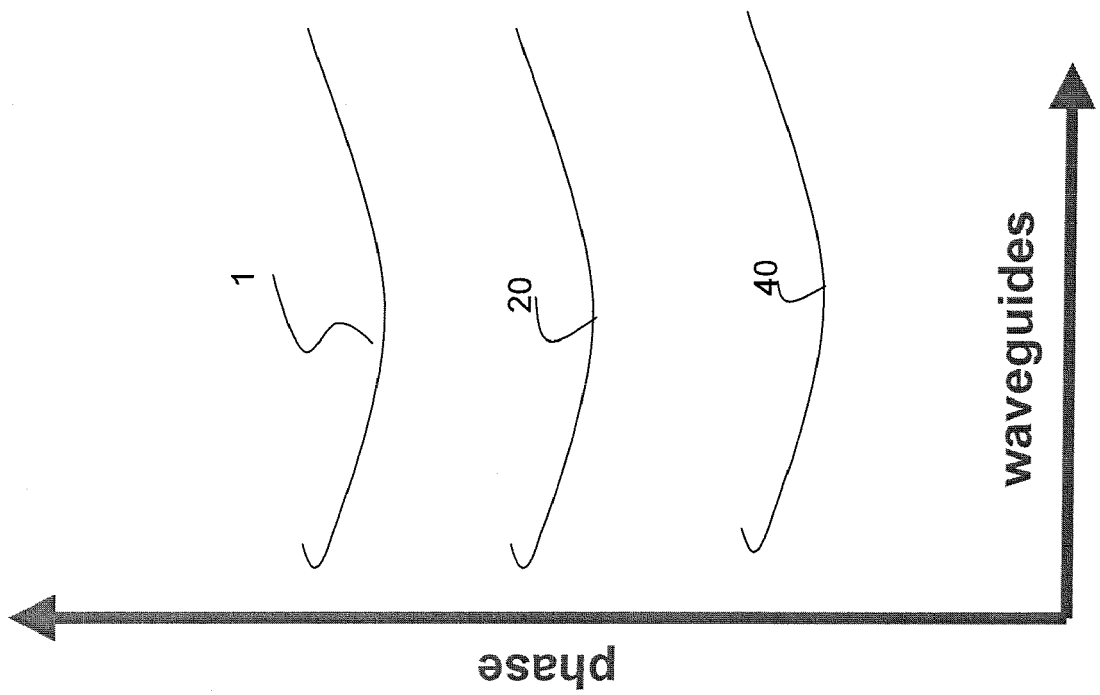
FIG. 10B is a schematic and simulated graphic illustration of the phase of the three outputs of FIG. 10A, where the grating line has been moved to an ellipse and the phase of each output is equal.
Figure 10B:
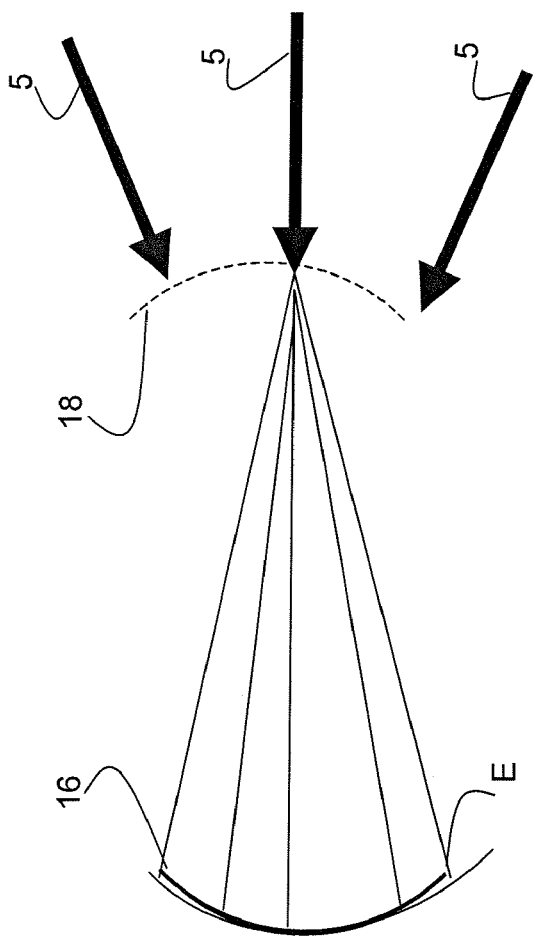
Figure 10C:
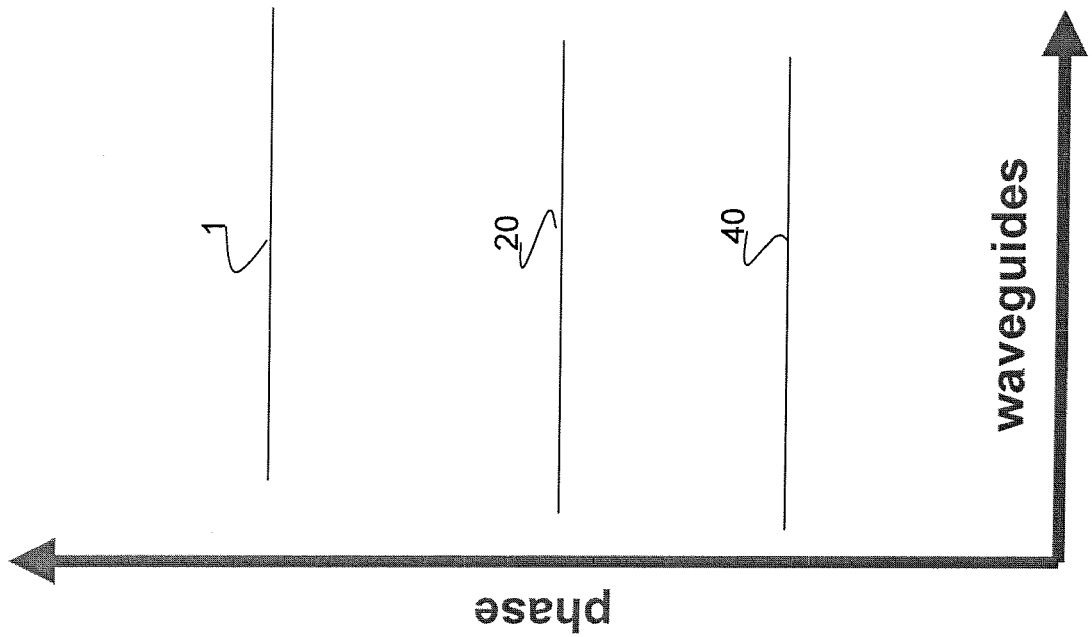
FIG. 10C is a schematic and simulated graphic illustration of the phase of the three outputs of FIG. 10B, where the phase of each output has been amended by adjusting the arm lengths of the grating (not shown).
Figure 10C:
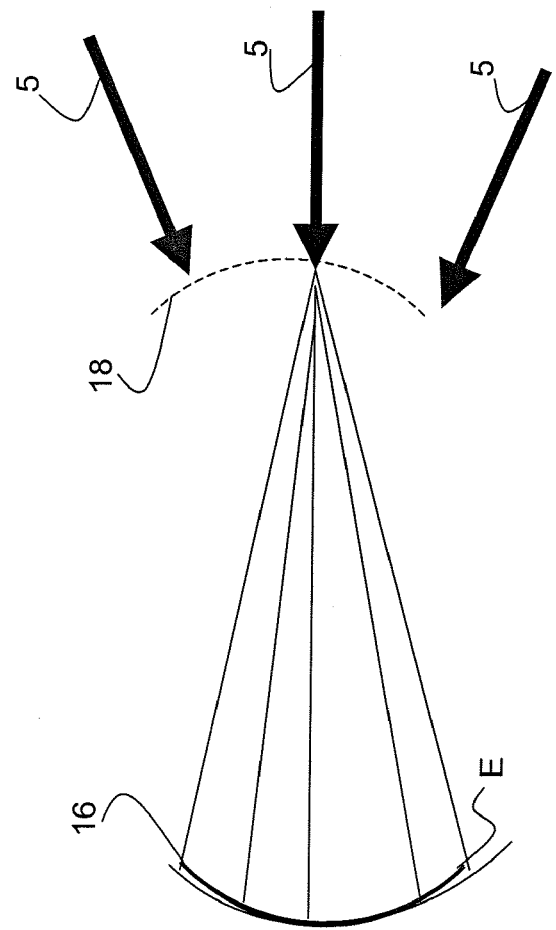
Figure 11:
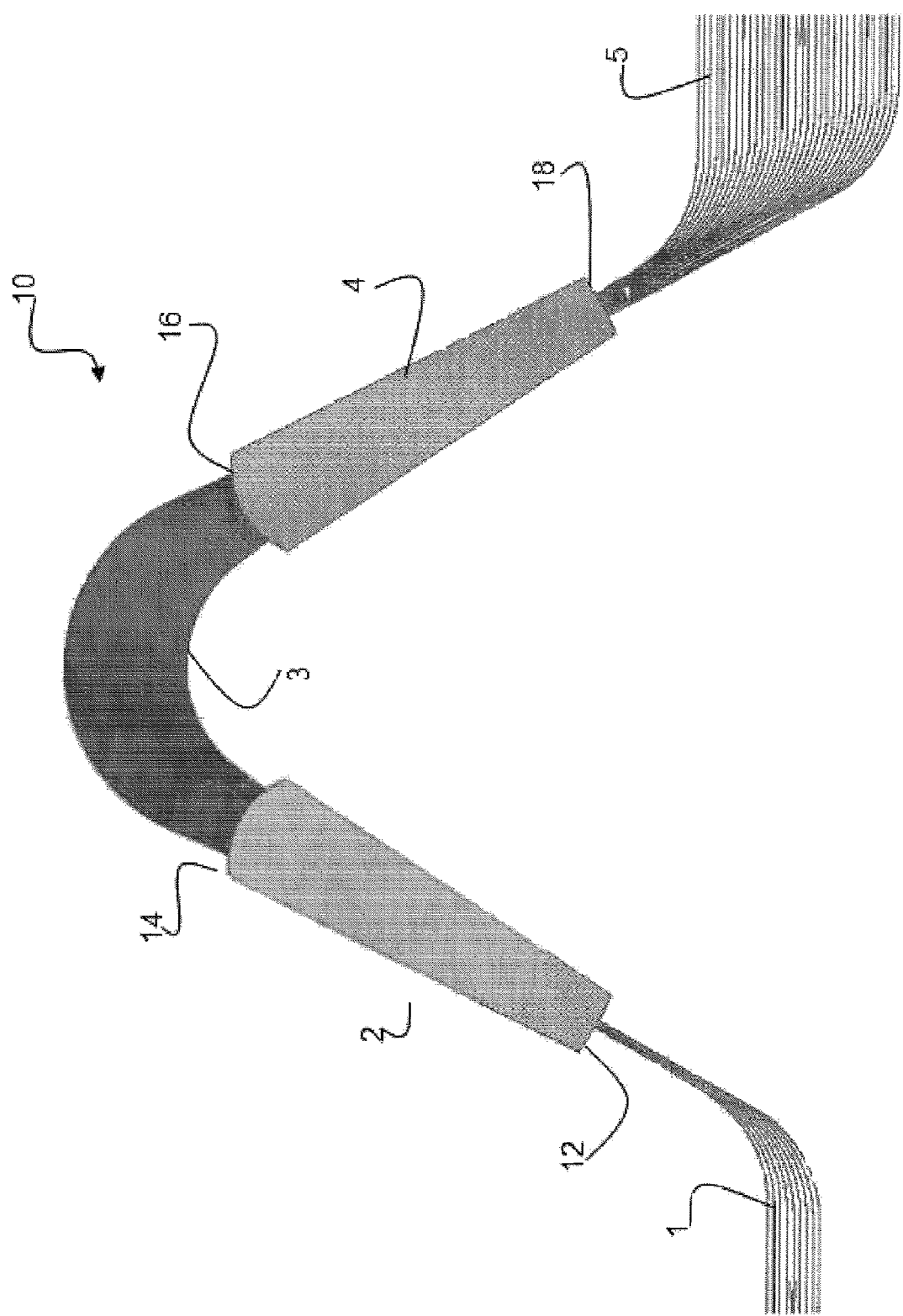
FIG. 11 is an illustration of an alternative arrayed waveguide grating in which the input star coupler has input waveguides away from the center and a non-circular elliptical grating line.

The invention presented in this document is a star coupler configuration, where the arrayed waveguides are placed on an elliptical arc instead of a circular arc, in order to reduce the passband degradation from port to port. FIG. 7 shows the configuration, where the arrayed waveguides 3 $A_k$ enter the output slab 4 on an elliptical arc E at $$\left( \begin{array}{c} R\sin\theta_k \\ -R\sqrt{1 - \frac{\sin^2\theta_k}{1+\varepsilon}} \end{array} \right)$$

in the reference system centered on F, instead of the standard circular arc $C_1$, where for $\varepsilon \neq 0$ when the elliptical arc E would then be identical to the original circular arc $C_1$. The array waveguides 3 are designed to ensure that the delays between each optical path through the AWG have a fixed increment. Each path consist of the length traveled through the input star coupler 2, the arrayed waveguides 3 consisting of a succession of bends with or without straight sections, and the output star coupler 4. Therefore, moving the waveguides from $C_1$ to E produces an average phase change in the optical paths. This can be compensated by adjusting the waveguide lengths in the array. This is illustrated in FIGS. 10A-10C. FIG. 10A illustrates the prior art star coupler with a grating line 16 of a circular arc of the confocal or Rowland configuration. Outputs 5 on the focal line 18 are graphed for phase at ports 1, 20 and 40. In this configuration the phase of the three outputs are not equal or flat. In FIG. 10B, the grating line 16 has been changed to elliptical E. The phase at ports 1,20 and 40 are now equal, though not flat. In FIG. 10C the configuration of FIG. 10B is amended by adjusting the waveguide lengths of the array 3 in order to create a flat phase in each channel.

The grating line 16 in accordance with the present invention is incorporated in an essentially standard AWG design based on a circular star coupler 4. The delays of the grating array are described by a substantially linear function, although this is not essential. These nominal delays of the standard AWG are not changed from a circular star coupler design. Only the individual channel phases are altered by the change in the star coupler geometry. Once the individual channels have a same phase, the average phase may be altered slightly in the array to achieve a preferred flat phase.

By using different eccentricity $\varepsilon$ with the same model exposed above, it was possible to find an optimized value at −0.25, where the phase linearity errors and their effects from port to port on the passbands are minimized.

Figures 8A, 8B:
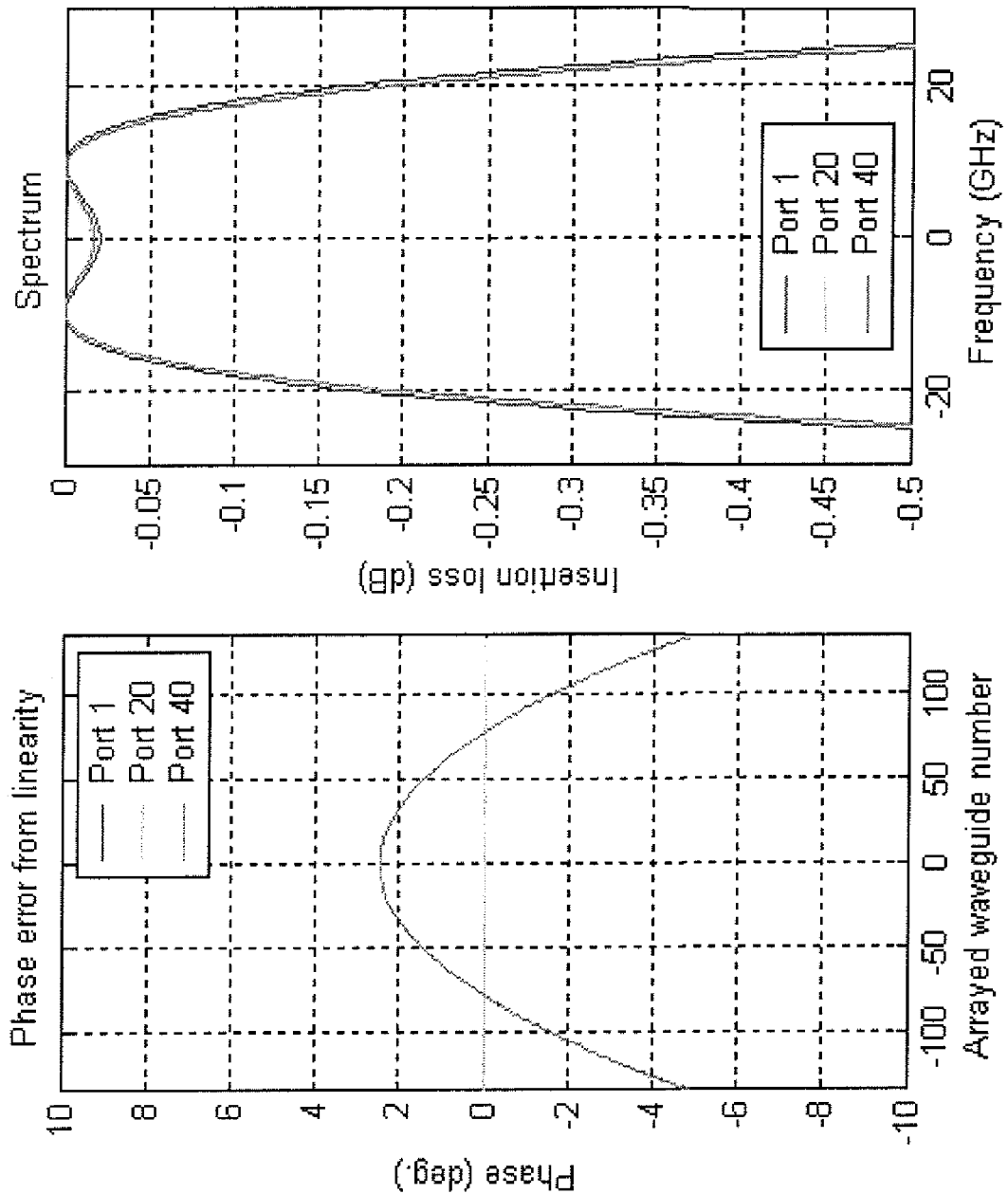
FIG. 8A is a graphic illustration of a simulation of the phase error from linearity calculated across three outputs of the AWG including the star coupler of FIG. 7.
FIG. 8B is a graphic illustration of the passband spectrum of the three outputs represented in FIG. 8A.

FIG. 8A shows the simulated phase error linearity for ports 1, 20, and 40 and the corresponding spectrum. As can be seen comparing FIG. 8A to FIG. 6A, the phase errors have been greatly reduced and are equal and symmetric for ports 1 and 40. Their effect on the passband shape from port to port is minimal.

Figure 9:
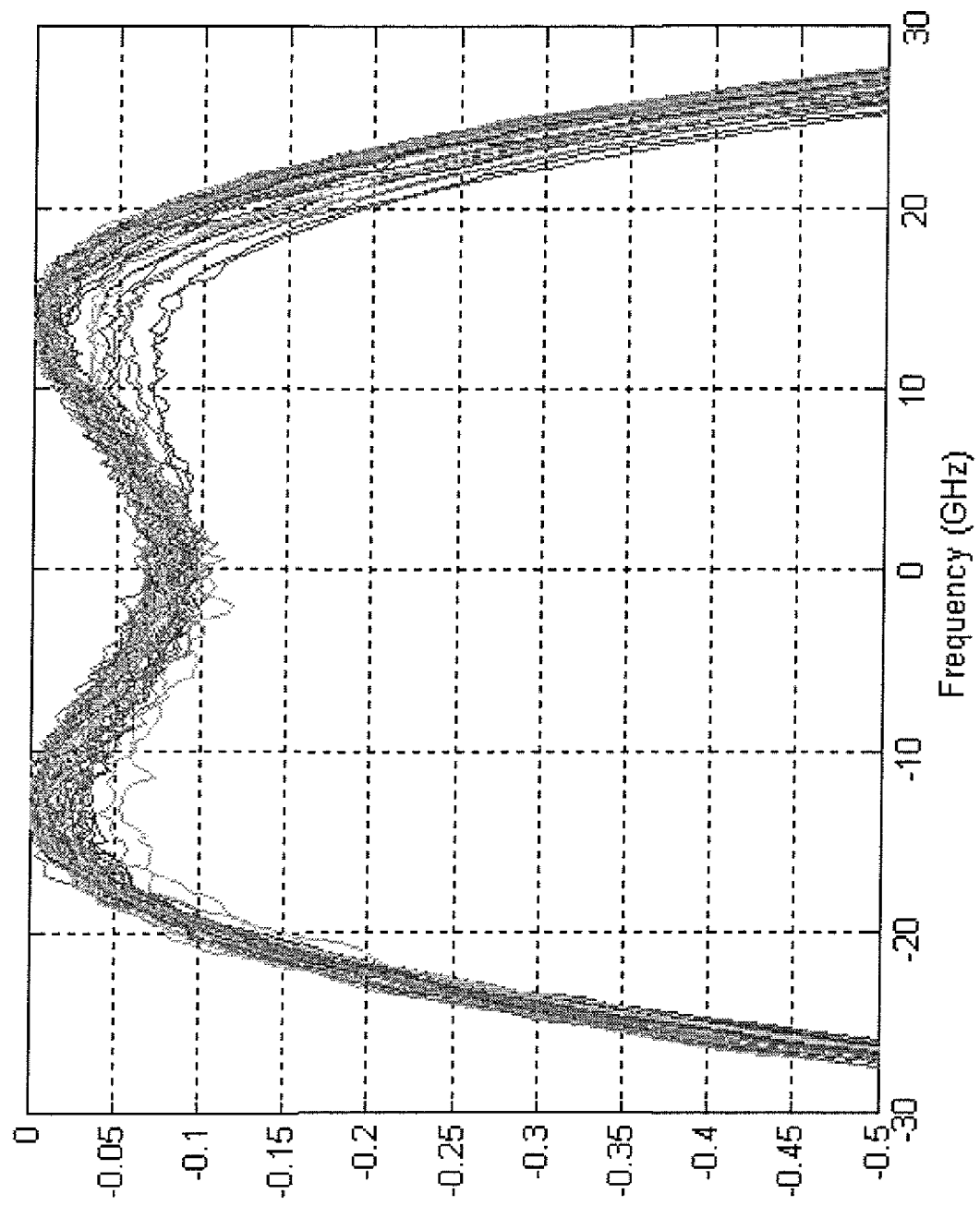
FIG. 9 is a graphic illustration of the passband of an AWG manufactured according to the present invention.

An AWG in accordance with the present invention was manufactured having an elliptical grating line having an eccentricity of −0.25. The measured passband across the 40 channel WDM spectrum is shown in FIG. 9. As can be seen, minimal variation occurs in the passband across the 40 outputs, enabling the AWG to exhibit good performances for all the outputs.

Once the grating line is determined, the design process using a layout program such as AutoCAD, draws the shortest waveguide and calculates its overall path length, eg. the combined path in the input star coupler, the waveguide array and the output star coupler to reach an assumed central output. In the final design there may not be an output at the centerpoint. An array is solved then by determining the correct delay increment for each subsequent waveguide in an iterative fashion until the Nth waveguide is solved.

While the invention has been described above with respect to specific embodiments, various modifications and substitutions may become apparent to one of skill in the art without departing from the present invention. For example, the waveguides can be placed on a grating line which approximates an ellipse, such as a sum of polynomial functions, that enables a correction of the phase linearity distortion from outputs to output. Therefore, the invention should not be limited by the examples of embodiments given above, but by the following claims.

I claim:

1. An optical grating for separating input light of a plurality of wavelengths into a plurality of spatially separated wavelength channel bands comprising:
    a grating having a concave grating line comprising a non-circular ellipse and having a focus f;

a plurality of outputs disposed on a substantially circular arc through f having a radius substantially equal to a focal length of the ellipse;

such that light in each wavelength channel band received at the outputs has substantially the same phase.

2. The optical grating as defined in claim 1, wherein the non-circular ellipse has an eccentricity of –0.25.

3. The optical grating as defined in claim 1, wherein the ellipse is approximated by a sum of polynomial functions approximating an ellipse.

4. An optical grating as defined in claim 1, wherein the optical grating comprises an integrated arrayed waveguide grating having:

at least one input waveguide optically coupled to a focal line of an input star coupler;

a grating comprised of a plurality of waveguide arms, the ends of the waveguide arms forming a grating line at each of the input star coupler and an output star coupler;

a plurality of output waveguides coupled to a focal line of the output star coupler, wherein the grating line of the output star coupler comprises a non-circular ellipse.

5. The optical grating as defined in claim 4, wherein the non-circular ellipse has an eccentricity of –0.25.

6. The optical grating as defined in claim 4, wherein the grating line of the input star coupler comprises a non-circular ellipse.

7. An optical grating as defined in claim 4, wherein the waveguide arms have an optical length so as to provide a flat phase for each output.

8. An optical grating as defined in claim 1, wherein the optical grating comprises an integrated echelle grating having:

at least one input waveguide;

an echelle grating having a grating line comprising a non-circular ellipse;

a free space region; and a plurality of output waveguides having ends thereof disposed in a substantially circular arc adjacent the free space region.

9. An optical grating as defined in claim 1 wherein the optical grating comprises a concave bulk grating having an ellipsoid profile.

10. An optical grating for separating input light of a plurality of wavelengths into a plurality of spatially separated wavelength channel bands comprising an arrayed waveguide grating having, in a demultiplexing direction:

a grating comprising a plurality of waveguide arms, each waveguide arm having an optical path length difference from any of the other waveguide arms;

an input star coupler optically coupled to the grating at an input grating line and optically coupled to at least one input waveguide at an input focal line;

an output star coupler optically coupled to the grating at an output grating line and optically coupled to a plurality of output waveguides at an output focal line, wherein the output grating line comprises a non-circular ellipse having a focal length, and the output focal line comprises a circular arc having a radius substantially equal to the focal length of the ellipse, and a centerpoint of the focal line disposed substantially a focal length of the ellipse from the grating line such that light in each channel band at the plurality of outputs has substantially a same phase.

11. An optical grating as defined in claim 10, wherein the non-circular ellipse of the output grating line has an eccentricity of –0.25.

12. An optical grating as defined in claim 11, wherein the optical path length in the grating waveguide arms is compensated such that light in each channel band at the plurality of outputs has a substantially flat phase.

13. An optical grating as defined in claim 10, wherein the input grating line of the input star coupler comprises a non-circular ellipse disposed a focal length of the ellipse from the input focal line which comprises a circular arc having a radius equal to the focal length of the ellipse, for receiving light from an input waveguide disposed at a non-centered position on the input focal line.

14. An optical grating as defined in claim 10, wherein the optical path length difference of the plurality of waveguide arms is calculated with respect to a circular output grating line; and optical delays created by the optical path length differences are substantially maintained in combination with the elliptical output grating line.

15. An optical grating as defined in claim 10, wherein the optical path length difference of the plurality of waveguide arms can be defined by a substantially linear function.

16. An optical grating as defined in claim 10, wherein the ellipse is approximated by a sum of polynomial functions approximating an ellipse.

* * * * *